US012621032B2

(12) United States Patent
Kumar et al.

(10) Patent No.: US 12,621,032 B2
(45) Date of Patent: May 5, 2026

(54) METHOD FOR BEAM MANAGEMENT IN SIDELINK COMMUNICATION

(71) Applicants: CENTRE OF EXCELLENCE IN WIRELESS TECHNOLOGY, Chennai (IN); INDIAN INSTITUTE OF TECHNOLOGY MADRAS (IIT MADRAS), Chennai (IN)

(72) Inventors: Anil Kumar, Chennai (IN); Abhijeet Abhimanyu Masal, Chennai (IN); Vikram Singh, Chennai (IN); Jeniston Deviraj Klutto Milleth, Chennai (IN); Bhaskar Ramamurthi, Chennai (IN)

(73) Assignees: CENTRE OF EXCELLENCE IN WIRELESS TECHNOLOGY, Chennai (IN); INDIAN INSTITUTE OF TECHNOLOGY MADRAS (IIT MADRAS), Chennai (IN)

( * ) Notice: Subject to any disclaimer, the term of this patent is extended or adjusted under 35 U.S.C. 154(b) by 450 days.

(21) Appl. No.: 18/106,924

(22) Filed: Feb. 7, 2023

(65) Prior Publication Data

US 2023/0254025 A1 Aug. 10, 2023

(30) Foreign Application Priority Data

Feb. 7, 2022 (IN) ............................ 202241006435

(51) Int. Cl.
*H04B 7/06* (2006.01)
*H04B 17/318* (2015.01)
(Continued)

(52) U.S. Cl.
CPC ......... *H04B 7/0632* (2013.01); *H04B 17/318* (2015.01); *H04B 17/336* (2015.01);
(Continued)

(58) Field of Classification Search
CPC .. H04B 7/0632; H04B 17/318; H04B 17/336; H04L 5/0005; H04L 5/0051; H04W 24/10; H04W 72/1263; H04W 72/20
See application file for complete search history.

(56) References Cited

U.S. PATENT DOCUMENTS

2018/0288645 A1* 10/2018 Lee .................... H04B 7/06952
2020/0059290 A1 2/2020 Pan et al.
(Continued)

FOREIGN PATENT DOCUMENTS

WO 2019029356 A1 2/2019
WO 2021093497 A1 5/2021

*Primary Examiner* — Deepa Belur
(74) *Attorney, Agent, or Firm* — Tarker Krinsky & Drogin LLP

(57) ABSTRACT

A method for beam management in side-link communication between User Equipment (UEs) (104) operating in a wireless communication network (100) is described. The method comprises transmitting a reference signal using at least one beam by a first UE (104-1). The first UE (104-1) receives a feedback report of the at least one beam based on the reference signal from the second UE (104-2, 104-4). The feedback report of the at least one beam comprises at least one of UE identifier (ID), beam ID, beam strength, and beam validity. The first UE (104-1) updates entries of a beam management table based on the feedback report.

34 Claims, 8 Drawing Sheets

(51) Int. Cl.

| | |
|---|---|
| ***H04B 17/336*** | (2015.01) |
| ***H04L 5/00*** | (2006.01) |
| ***H04W 24/10*** | (2009.01) |
| ***H04W 72/1263*** | (2023.01) |
| ***H04W 72/20*** | (2023.01) |

(52) U.S. Cl.

CPC .......... *H04L 5/0005* (2013.01); *H04L 5/0051* (2013.01); *H04W 24/10* (2013.01); *H04W 72/1263* (2013.01); *H04W 72/20* (2023.01)

(56) References Cited

U.S. PATENT DOCUMENTS

| | | | | |
|---|---|---|---|---|
| 2020/0395993 | A1* | 12/2020 | Ryu | H04W 64/00 |
| 2021/0360462 | A1* | 11/2021 | Taherzadeh Boroujeni | H04B 7/088 |
| 2022/0287072 | A1* | 9/2022 | Xue | H04W 72/23 |
| 2022/0368399 | A1* | 11/2022 | Gao | H04B 7/0695 |
| 2023/0135397 | A1* | 5/2023 | Nikain | H04L 45/70 709/238 |
| 2023/0156664 | A1* | 5/2023 | Wang | H04L 1/08 370/329 |
| 2023/0232363 | A1* | 7/2023 | Nam | H04W 48/04 455/456.1 |
| 2023/0262520 | A1* | 8/2023 | Sarkar | H04B 7/06952 370/235 |
| 2024/0056233 | A1* | 2/2024 | Kim | H04L 5/00 |
| 2024/0089944 | A1* | 3/2024 | Liu | H04W 72/542 |

* cited by examiner

200

202 Transmit a reference signal using at least one beam

204 Receive a feedback report of the at least one beam based on the reference signal 206 Update entries of a beam management table based on the feedback report Start Stop

METHOD FOR BEAM MANAGEMENT IN SIDELINK COMMUNICATION

FIELD OF THE INVENTION

The present invention relates to sidelink communication in a wireless communication system, and more particularly to a method for beam management in sidelink communication system.

BACKGROUND OF THE INVENTION

Sidelink communication in New Radio (NR) may be used for sharing information between devices, without or with minimal involvement of a base station (gNB). NR requires a new design of a physical layer different from conventional design used for Enhanced Mobile Broadband (eMBB). In the new design of the physical layer, PC5 interface is defined for communicating nodes among themselves in the 3rd Generation Partnership Project (3GPP). 3GPP Release 12 has introduced direct device-to-device (D2D) communication for proximity services using cellular technologies. Based on the D2D communication work in Rel-12, a first cellular V2X (C-V2X) was developed on 4G Long Term Evolution (LTE) air interface under Rel-14 and was further enhanced during Rel-15. 3GPP has developed a new cellular V2X standard during Rel-16 based on 5G NR air interface. In Rel-17, new enhancements such as power saving and inter-UE coordination have been made to improve the existing resource allocation method. In the conventional methods, Side-link Synchronization Signal Block (S-SSB) and/or Side-link Channel State Information Reference Signal (SL-CSI-RS) is used in sidelink communication for improving power saving and inter-UE coordination. However, the conventional methods do not explicitly use S-SSB and SL-CSI-RS for beam management. Rel-17 does not define an explicit beam management method.

Thus, there is a need of a method of beam management in NR sidelink communication, which addresses the above-mentioned shortcomings.

OBJECTS OF THE INVENTION

A general objective of the present invention is to provide a method for beam management in NR sidelink communication.

Another objective of the present invention is to provide a method validating a reported sidelink beam using Artificial Neural Network (ANN).

SUMMARY OF THE INVENTION

The summary is provided to introduce aspects related to beam management in side-link communication between User Equipment (UEs) operating in a wireless communication network, and the aspects are further described below in the detailed description. This summary is not intended to identify essential features of the claimed subject matter nor is it intended for use in determining or limiting the scope of the claimed subject matter.

The present invention relates to beam management in side-link communication between User Equipment (UEs) operating in a wireless communication network. The method may comprise transmitting, by at least one first UE, at least one reference signal using at least one beam. The at least one first UE may receives feedback report of the at least one beam from at least one second UE based on the at least one reference signal. The feedback report of the at least one beam comprises at least one of UE identifier (ID), beam ID, beam strength, and beam validity. Entries of a beam management table is updated based on the feedback report.

In an aspect, the at least one first UE may schedule the transmission of the at least one beam using the beam management table.

In an aspect, the at least one first UE may transmit the reference signal when the at least one first UE determines that the entries of the beam management table are one of unknown and invalid.

In an aspect, the reference signal may be at least one of a Side-link Synchronization Signal Block (S-SSB) and a Side-link Channel State Information Reference Signal (SL-CSI-RS).

In an aspect, a plurality of SL-CSI-RS beams may be multiplexed in at least one of time, frequency, and space, are transmitted in different directions.

In an aspect, the plurality of SL-CSI-RS beams may be configured using at least one of the Radio Resource Control (RRC) message, Medium Access Control-Control Element (MAC-CE) message, Down link Control Information (DCI), and Side-link Control Information (SCI).

In an aspect, the S-SSB may be functions of time offset, time interval, number of S-SSBs transmitted in different directions using different beams over time, and S-SSB index within the number of S-SSBs in a S-SSB period.

In an aspect the at least one second UE may measure at least one beam strength of a plurality of beams received from the at least one first UE over at least one reference signal. The beam strengths are measured as a function of at least one of S-SSB-Reference Signal Receiver Power (RSRP), SL-CSI-RS-Reference Signal Receiver Power (RSRP), SL-CSI-RS-Signal to Interference Plus Noise Ratio (SINR), and S-SSB-Signal to Interference Plus Noise Ratio (SINR). The at least one second UE may compare the at least one beam strength of the plurality of beams with a threshold value. The threshold value may be a function of at least one of a S-SSB-RSRP threshold value, a S-SSB-SINR threshold value, a SL-CSI-RS-RSRP threshold value, and a SL-CSI-RS-SINR threshold value. The at least one second UE may select the at least one beam based on the comparison. Further, the at least one second UE may report at least one information of the at least one beam to the at least one first UE.

In an aspect, the at least one beam may be one of S-SSB beam and SL-CSI-RS beam.

In an aspect, the reporting of at least one information of the at least one beam may comprise at least one of the beam-id, beam-strength, and beam validity.

In an aspect, the at least one information of the at least one beam may be reported by the at least one second UE using at least one time-frequency resource, and the at least one time-frequency resource is provided by one of the at least one first UE and a Base Station (BS).

In an aspect, number of beams to be selected may be configured by the at least one first UE.

In an aspect, the reporting of the at least one information is performed using fixed time-frequency resources allocated to the at least one beam.

In an aspect, the reporting of the at least one information comprises transmission of at least one of an absolute value and relative value of the at least one information of the at least one beam in per-determined resources.

In an aspect, the at least one information is transmitted as one of a quantized value and an unquantized value.

In an aspect, the at least one beam selected by the at least one second UE using SSB beam may be reported, in a time instant ($T_{slotgap}$) after a last S-SSB is transmitted over the S-SSB period. The last S-SSB may be transmitted in a slot with a value determined by:

$$\text{timeoffsetSSBSL}+\text{timeIntervalSSBSL}*No_{S\text{-}SSB}-1$$

In above equation, timeoffsetSSB-SL indicates an offset in terms of slots from a start of the period to the slot in which a first S-SSB is transmitted, timeIntervalSSB-SL indicates a slot interval between consecutive S-SSBs, and $No_{S\text{-}SSB}$ represents a number of S-SSBs transmitted in different directions using different beams over the S-SSB-period and an S-SSB index ($i_{S\text{-}SSB}$) within the number of S-SSBs in the period.

In an aspect, the S-SSB index ($i_{S\text{-}SSB}$) may be determined using:

$$i_{S\text{-}SSB}=(\text{slotindex}-\text{timeoffsetSSBSL})/\text{timeIntervalSSBSL}$$

In above equation, slot index indicates the slot in which S-SSB is transmitted in the S-SSB period.

In an aspect, the at least one information of the at least one beam may be reported implicitly by transmitting a sequence as a function of a UE-ID over sub-channels corresponding to the at least one beam using the fixed time-frequency resources allocated to the at least one second UE.

In an aspect, the UE-ID may be mapped with predefined sequences and may be detected by the at least one first UE using a correlation operation between the sequence received from the at least one second UE and a pre-defined sequence.

In an aspect, the mapping may be provided by at least one of RRC message, MAC-CE message, DCI, and SCI.

In an aspect, the reporting may be performed over at least one of RRC message, MAC-CE, DCI, and SCI.

In an aspect, the beam id may be log 2 (N) bit long for one of N beams. N is a number of at least one of the SL-CSI-RS beam and the S-SSB-beam.

In an aspect, the beam id may be N bits long. A bit position in the beam id corresponds to the beam to be reported.

In an aspect, the bit position of the bit map may be set to one of 0 and 1 if the corresponding beam is to be reported, otherwise set to compliment of one of 0 and 1.

In an aspect, the beam strength may be reported using M*b bits, wherein M is number of bits per beam strength and b is number of beam strength to be reported.

In an aspect, the beam strength may be reported using M*b bits, wherein M is number of bits per beam strength and b is number of beam strength to be reported.

In an aspect, the beam validity may be reported using at least one absolute value measured in at least one of number of symbols, mini slots, slots, subframes, frames, and beam validity probability over a time interval.

In an aspect, the at least one absolute value may be quantized using maximum possible absolute value and pre-configured resolution as:

$$\text{QuantizeOp}[T_{absoulte}/V_{resolution}]$$

In above equation, $T_{absolute}$ indicates a maximum value of absolute time and $V_{resolution}$ indicates a resolution to indicate validity pre-configured by the wireless communication network.

In an aspect, a time duration of the at least one beam validity may be reported for which the beam valid probability is above a predefined threshold.

In an aspect, the beam validity may be computed by implementing at least one of a regression-based model and a reinforcement-based model, on a data set. The data set is received from one or more of at least one of the first UE and at least one of the second UE.

In an aspect, the data set may comprise at least one of a Doppler shift, UE direction, UE speed, beam-strength, and beam angle measured by at least one of the second UE.

In an aspect, the Doppler shift may indicate a relative motion between the at least one first UE and the at least one second UE.

In an aspect, the beam angle may be measured as an elevation angle and azimuth angle of a peak of a radiation pattern of an antenna array.

In an aspect, the regression-based model may be trained using training data sets received from the at least one second UE.

In an aspect, the at least one beam validity may be computed using the reinforcement-based model by predicting at least one value of probability indicating that corresponding beam is valid for a time period.

In an aspect, the time period may be defined in terms of at least one of symbols, mini slots, slots, sub frames, frames, seconds, m sec, and micro sec.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE INVENTION

As used in the description herein and throughout the claims that follow, the meaning of "a," "an," and "the" includes plural reference unless the context clearly dictates otherwise. Also, as used in the description herein, the meaning of “in” includes “in” and “on” unless the context clearly dictates otherwise.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

In sidelink communication, beam management may be performed by configuring a User Equipment (UE) to be a Synchronization Reference UE (SyncRefUE). In general, two procedures may be defined in the sidelink communication for the SyncRefUE. In a first procedure, a network may configure the UE to become the SyncRefUE by Network-ControlledSyncTx field provided in the SL-phy-mac-rlc-config-r16 information element. The SL-phy-mac-rlc-config-r16 information may be sent over a Radio Resource Control (RRC) protocol from associated Base Station (BS). In a second procedure, the UE may become the SyncRefUE based on a Reference Signal Received Power (RSRP) measurement over Physical Broadcast Channel (PBCH) Demodulation Reference Signal (DM-RS) of a received Sidelink Synchronization Signal Block (S-SSB) from a synchronization reference.

Figure 1:
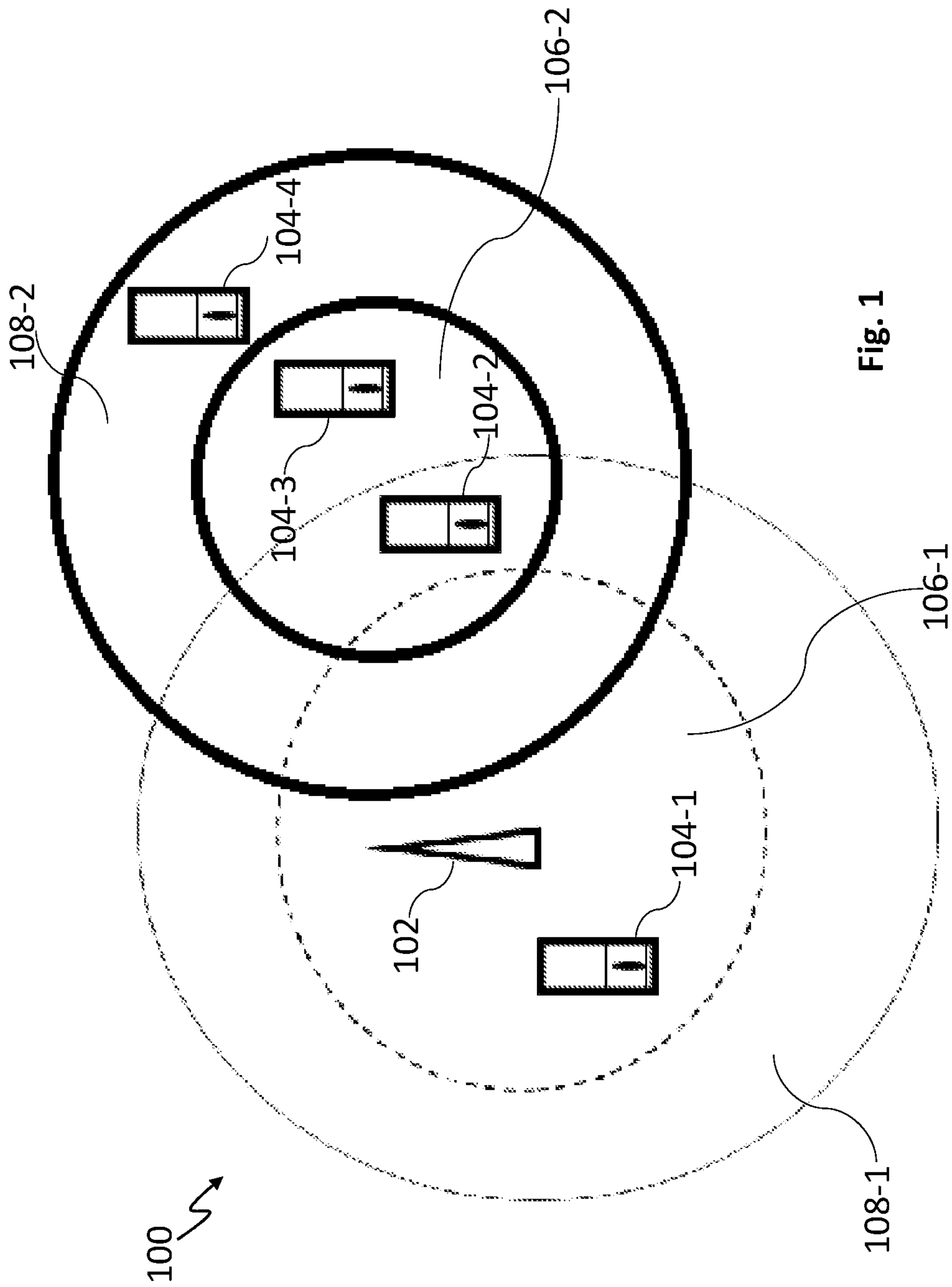
FIG. 1 illustrates an architecture of a wireless communication network, in accordance with an embodiment of the present invention.

FIG. 1 illustrates an architecture of a wireless communication network 100, in accordance with an embodiment of the present invention. The wireless communication network 100 may comprise a Base Station (BS) 102 and User Equipments (UEs), such as a first UE 104-1 through $n^{th}$ UE **104-*n*. The first UE 104-1 through $n^{th}$ UE 104-*n* are cumulatively referred as a UE 104 for the ease of labelling and explanation. The BS 102 may communicate with the UE 104. The UE 104 may be either stationary or mobile and may be dispersed throughout the wireless communication network 100**.

The wireless communication network 100 may be divided into regions 106-1, 106-2, 108-1 and 108-2. The UE 104-1 and UE 104-3 may lie in the region 108-1 and region 108-2, respectively. In the region 108-1 and the region 108-2, the RSRP measured over PBCH DM-RS of a serving cell is above a pre-defined threshold. The UE 104-2 and UE 104-4 may lie in the region 106-1 and region 106-2, respectively. In the region 106-1 and the region 106-2, the RSRP measured over PBCH DM-RS of the serving cell is below the pre-defined threshold. Since the RSRP of the region 108-1 and the region 108-2 is more than the pre-defined threshold, the UE 104-1 and UE 104-3 may not be able to become the SyncRefUE, whereas, since the RSRP of the region 106-1 and the region 106-2 is less than the pre-defined threshold, the UE 104-2 and UE 104-4 may become the SyncRefUE. The RSRP based procedure results in having UEs near to edge of the serving cell to become the SyncRefUE.

Figure 2:
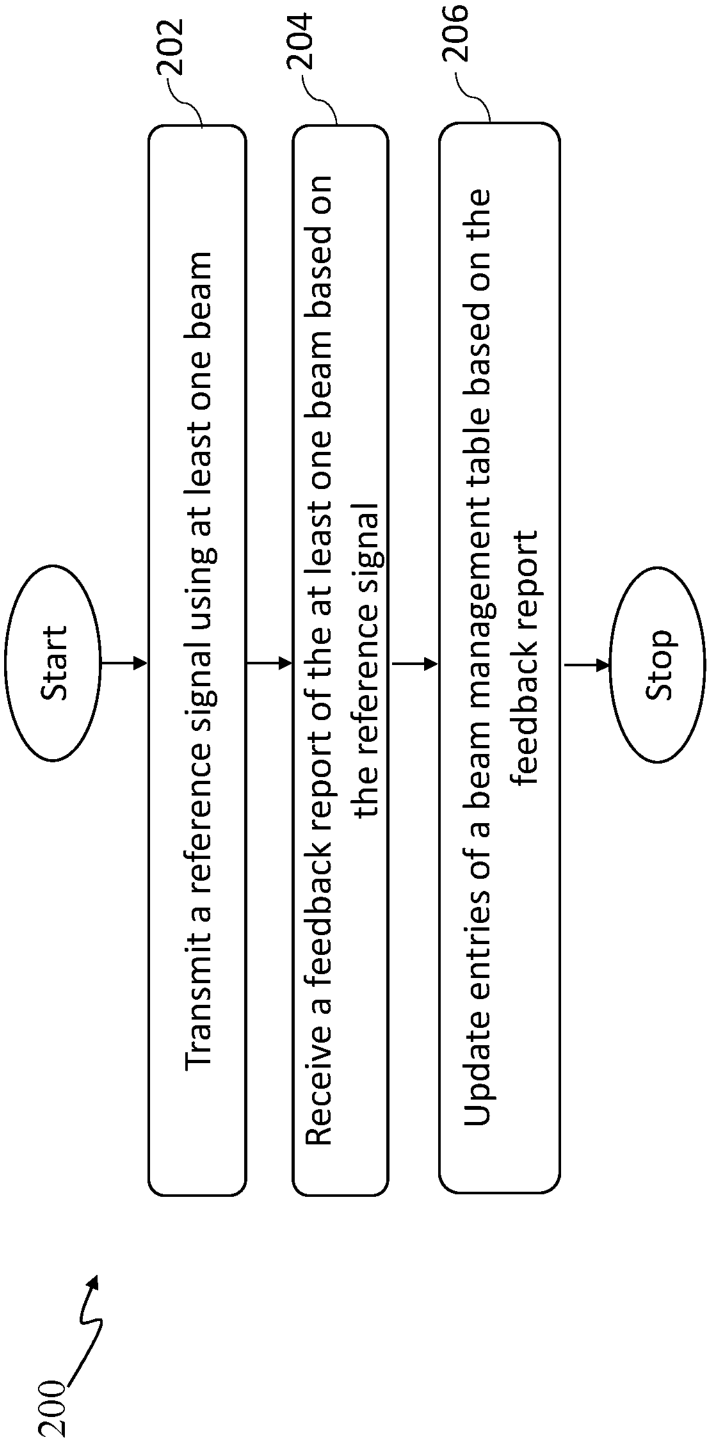
FIG. 2 illustrates a flow chart of a method of beam management in side-link communication between User Equipments (UEs), in accordance with an embodiment of the present invention.

FIG. 2 illustrates a flow chart 200 of a method of beam management in side-link communication between the UEs 104 operating in the wireless communication network 100, in accordance with an embodiment of the present invention. It should also be noted that in some alternative implementations, the functions noted in the blocks may occur out of the order noted in the drawings. For example, two blocks shown in succession in FIG. 2 may in fact be executed substantially concurrently or the blocks may sometimes be executed in the reverse order, depending upon the functionality involved. Alternate implementations are included within the scope of the example embodiments in which functions may be executed out of order from that shown or discussed, including substantially concurrently or in reverse order, depending on the functionality involved.

In the wireless communication network 100, one of the UEs 104, such as the UE 104-1 may act as a transmitting UE (a first UE) and other UEs 104, such as the UE 104-2 and the UE 104-4 (a second UE), may act as receiving UEs. The transmitting UE 104-1 may transmit a reference signal to the receiving UEs 104-2, 104-4, at step 202. The reference signal may be transmitted using at least one beam. The at least one beam may be S-SSB beam or SL-CSI-RS beam. The transmitting UE 104-1 may receive a feedback report of the at least one beam based on the reference signal from the one or more receiving UEs 104-2, 104-4, at step 204. The feedback report may include UE identifier (ID), Beam-ID, beam-strength, and beam-validity of the receiving UEs 104-2, 104-4. The transmitting UE 104-1 may update entries of a beam management table based on the feedback report, at step 206. The beam management table may be utilized for scheduling transmission of beams to the one or more receiving UEs 104-2, 104-4.

The transmitting UE 104-1 may perform beam management by maintaining a beam management table (shown below as Table 1). Entries within the table may be updated based on the feedback report received from the receiving UEs 104-2, 104-4. For example, for ‘N’ number of receiving UEs 104-2, 104-4 managed by the transmitting UE 104-1, the feedback report may contain four entries namely receiving UE identifier (ID), Beam-ID, beam-strength, and beam-validity for each of the receiving UEs 104-2, 104-4.

TABLE 1

| UE-id | Beam-id | Beam-strength | Beam-validity |
|---|---|---|---|
| $UE_1$ | $Bid_1$ | $Bs_1$ | $V_1$ |
| $UE_2$ | $Bid_2$ | $Bs_2$ | $V_2$ |
| $UE_3$ | $Bid_3$ | $Bs_3$ | $V_3$ |
| ⋮ | ⋮ | ⋮ | ⋮ |
| $UE_N$ | $Bid_N$ | $Bs_N$ | $V_N$ |

The ID may be used to identify a particular receiving UE, for example the receiving UE 104-2 out of all the receiving UEs 104-2, 104-4. The beam-id may provide information about the beam currently serving the receiving UEs 104-2, 104-4. The beam-strength may provide information about the strength determined using at least one of the measurements from beam-strength, beam-RSRP, and beam-SINR. The beam-validity may provide details about a validity of the beam. The transmitting UE 104-1 may receive the feedback report from the one or more receiving UEs 104-2, 104-4.

The transmitting UE 104-1 may update entries of the beam management table (Table 1 shown above) based on the feedback report received from the receiving UEs 104-2, 104-4. Contents of the feedback report may not include some fields, such as the UE-id and the beam-id. If there may be a fixed allocation for reporting of every beam, then beam-id is not required in the feedback report. The beam-id may be needed when there is no fixed allocation for reporting of each beam.

The transmitting UE 104-1 may schedule the transmission of the at least one beam using the beam management table. The transmitting UE 104-1 may transmit the beam reference signal to the receiving UEs 104-2, 104-4 when the transmitting UE 104-1 determines that a beam received from the receiving UEs 104-2, 104-4 is unknown and invalid.

The transmitting UE 104-1 may transmit the beam reference signal in form of Side-link Synchronization Signal Block (S-SSB) and/or Side-link Channel State Information Reference Signal (SL-CSI-RS). The transmitting UE 104-1 may multiplex SL-CSI-RS beams in at least one of time, frequency, and space. Further, the transmitting UE 104-1 may transmit the SL-CSI-RS beams in different directions. The SL-CSI-RS beams may be configured using Radio Resource Control (RRC) message and/or Medium Access Control-Control Element (MAC-CE) message.

Figure 3:
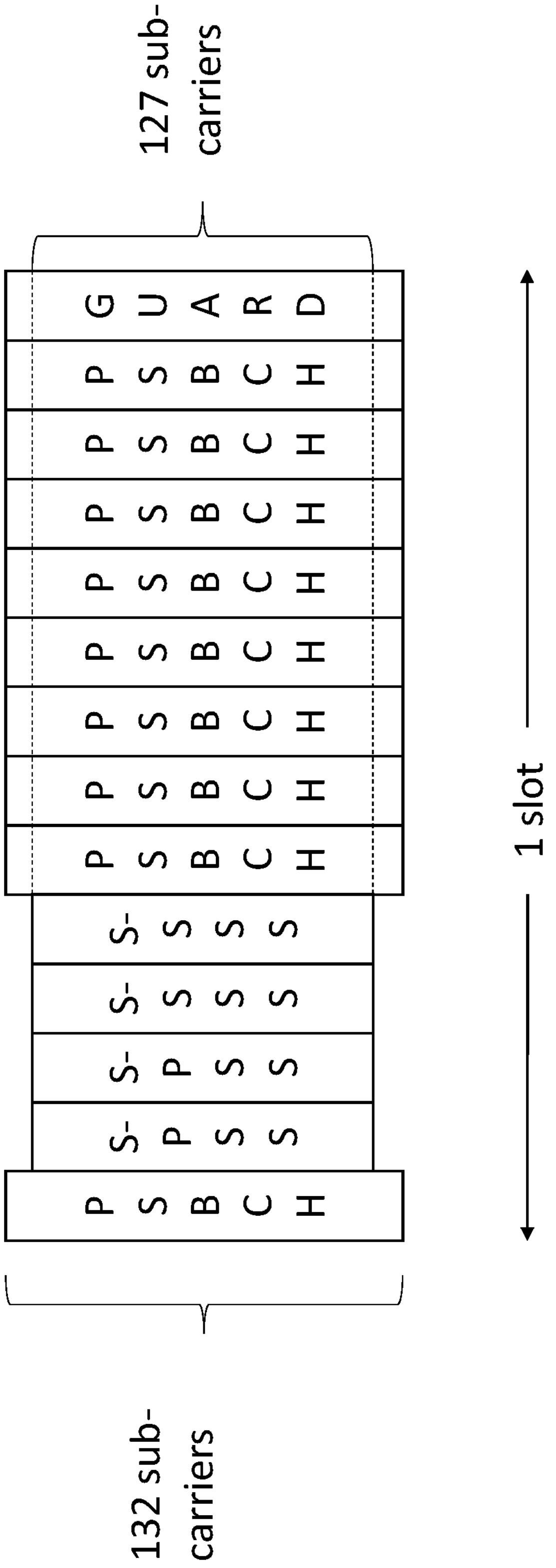
FIG. 3 illustrates a time-frequency structure of Side-link-Synchronization Signal Block (S-SSB), in accordance with an embodiment of the present invention.

The transmitting UE 104-1 acting as a SyncRefUE may transmit the S-SSB as a reference signal for slot level synchronization between V2X devices when there is no BS (e.g. gNB, eNB, and NB) and/or GNSS (e.g. GPS and NavIC). FIG. 3 illustrates a time-frequency structure of the S-SSB, in accordance with an embodiment of the present invention. In time-domain, the S-SSB may be transmitted using $N_{symb}^{S\text{-}SSB}$OFDM symbols, numbered from 0 to $N_{symb}^{S\text{-}SSB}-1$, where Primary Synchronization Signals (S-PSS) are mapped to second and third symbol, Secondary Synchronization Signals (S-SSS) are mapped to fourth and fifth symbol. Physical Sidelink Broadcast Channel (PSBCH) with associated DM-RS are mapped to first, sixth, and eighth symbols after the S-SSS depending upon normal or extended cyclic prefix. A last symbol is used for guard period. A value of $N_{symb}^{S\text{-}SSB}$ may be 13 for a normal cyclic prefix and may be 11 for an extended cyclic prefix. In a frequency domain, S-SSB may be mapped to 132 contiguous subcarriers numbered from 0 to 131.

Figure 4:
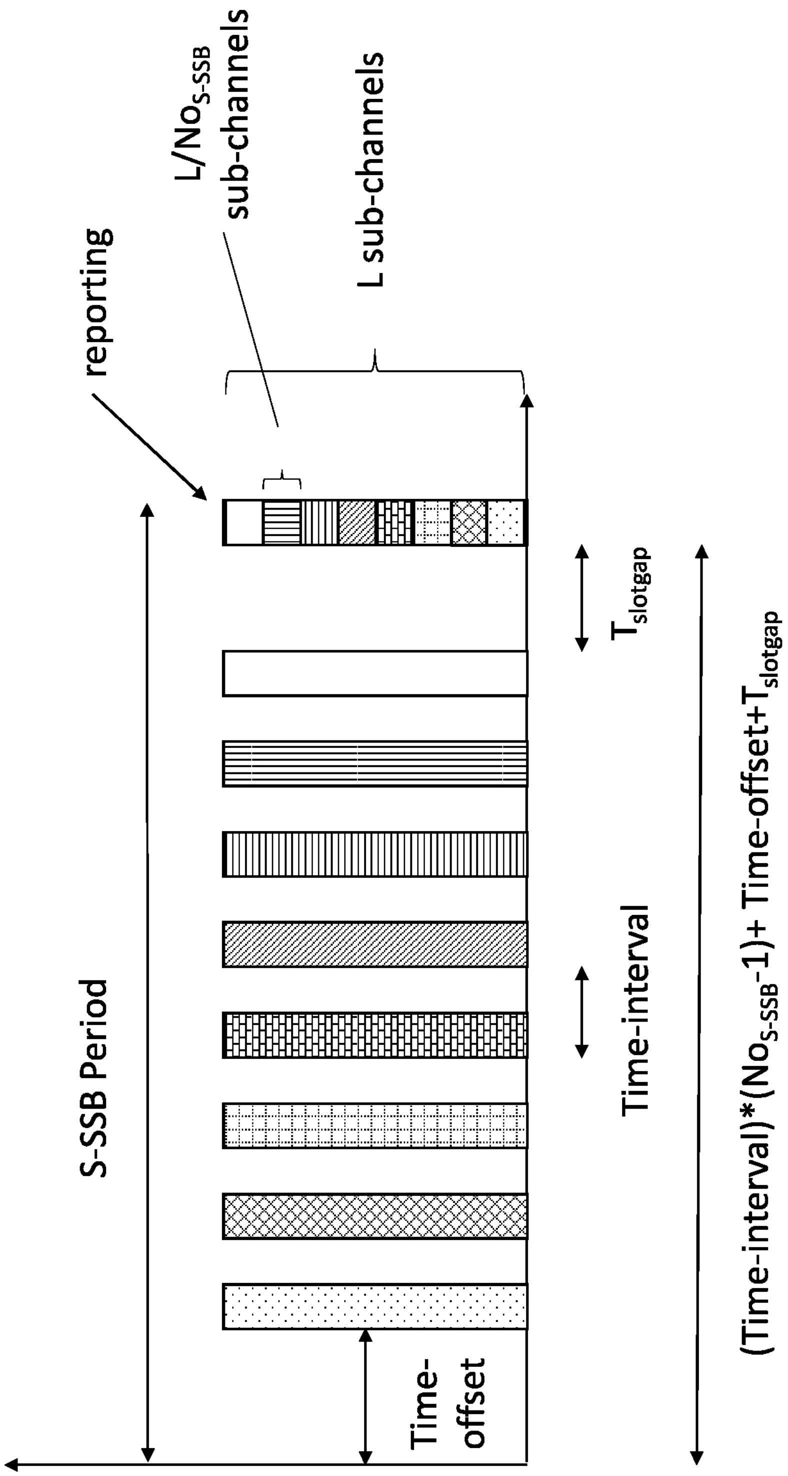
FIG. 4 illustrates an SSB frame for transmission of S-SSB, in accordance with an embodiment of the present invention.

FIG. 4 illustrates an SSB frame for transmission of the S-SSB, in accordance with an embodiment of the present invention. The SyncRefUE may transmit number of S-SSBs over an S-SSB-period of 16 frames. The SSB period may be determined using below provided equation (1).

$$\text{SSBperiod}=(\text{Timeinterval})*(\text{No}_{S\text{-}SSB}-1)+\text{Timeoffset}+T_{slotgap} \quad (1)$$

In above mentioned equation 1, Time offset may be an offset in terms of slots from a start of the SSB period to the slot in which the first S-SSB is transmitted. The Time offset may be provided by timeoffsetSSB-SL. The Time interval may be a slot interval between consecutive S-SSBs. The Time interval may be provided by timeIntervalSSB-SL. $\text{No}_{S\text{-}SSB}$ may be the number of S-SSBs transmitted in different directions using different beams over time S-SSB-Period. $\text{No}_{S\text{-}SSB}$ may be provided using by numSSBwithinPeriod-SL and $i_{S\text{-}SSB}$ may be S-SSB index within the number of S-SSBs in the period, with $0 \le i_{S\text{-}SSB} \le \text{No}_{S\text{-}SSB}-1$.

The transmitting UE 104-1 may configure different beams over each S-SSB index indicated by $i_{S\text{-}SSB}$. The receiving UE 104-2 may receive the S-SSB beams and may measure beam strengths of a plurality of beams between the receiving UE 104-2 and the transmitting UE 104-1. The beam strength may be measured as a function of an S-SSB-Reference Signal Receiver Power (RSRP), SL-CSI-RS-Reference Signal Receiver Power (RSRP), SL-CSI-RS-Signal to Interference Plus Noise Ratio (SINR), or an S-SSB-Signal to Interference Plus Noise Ratio (SINR). The measurement of the beam strength may be performed using S-PSS, S-SSS, or PBCH-DMRS. The receiving UE 104-2 may compare the beam strengths of the plurality of beams with a threshold value. The wireless communication network 100 may configure the LIE 104 with the threshold value. The threshold value may be a function of an S-SSB-RSRP threshold value, an S-SSB-SINR threshold value, a SL-CSI-RS-RSRP threshold value, and/or a SL-CSI-RS-SINR threshold value. The receiving UE 104-2 may select a best beam from the plurality of beams based on the comparison between the beam strengths of the plurality of beams and the threshold value.

In one implementation, the receiving UE 104-2 may report information of the best beam to the transmitting UE 104-1. In an implementation, the information may be reported to the transmitting UE 104-1 through implicit reporting. The implicit reporting may use fixed allocation of resources per S-SSB beam reporting, as illustrated in FIG. 4. The receiving UE 104-2 may report the best beam in a $T_{slotgap}$ time instant after a last S-SSB is transmitted over the S-SSB period. The at least one beam may be reported by the second UE 104-2, 104-4 using a frequency resource. The frequency resource may be provided by the first UE 104-1 or a Base Station (BS) 102. The reporting of the at least one information may be performed using fixed time-frequency resources allocated to the at least one beam. The reporting of the at least one information may comprise transmission of an absolute value and/or relative value of the at least one information of the at least one beam in per-determined resources. The at least one information may be transmitted as a quantized value or an unquantized value. The last S-SSB may be transmitted in a slot with a value determined using below mentioned equation (2).

$$\text{timeoffsetSSB-SL}+\text{timeIntervalSSB-SL}*\text{No}_{S\text{-}SSB}-1 \quad (2)$$

In above equation, timeoffsetSSB-SL represents an offset in terms of slots from a start of the period to the slot in which a first S-SSB is transmitted, timeIntervalSSB-SL represents a slot interval between consecutive S-SSBs, and $\text{NO}_{S\text{-}SSB}$ represents a number of S-SSBs transmitted in different directions using different beams over the S-SSB-period and an S-SSB index ($i_{S\text{-}SSB}$) within the number of S-SSBs in the period.

The receiving UE 104-2 may identify resources to report the corresponding beam measurements. If L number of sub-channels is configured to report $\text{No}_{S\text{-}SSB}$ beams, then the receiving UE 104-2 may utilize QuantizeOp[L/$\text{No}_{S\text{-}SSB}$] number of sub-channels for reporting each beam measurements. The receiving UE 104-2 may determine sub-channels for reporting the beam measurements using the index of the decoded S-SSB ($i_{S\text{-}SSB}$). The S-SSB index ($i_{S\text{-}SSB}$) may be determined using "slot index". Each S-SSB payload may contains a field "slot index" for determining slots in which S-SSB may be transmitted in S-SSB period. The S-SSB index ($i_{S\text{-}SSB}$) is determined using below mentioned equation 3.

$$i_{S\text{-}SSB}=(\text{slotindex}-\text{timeoffsetSSB-SL})/\text{timeIntervalSSB-SL} \quad (3)$$

In above equation, a slot index represents the slot in which S-SSB is transmitted in the S-SSB period. The receiving UE 104-2 may report the beam measurements using lower QuantizeOp[L/$\text{No}_{S\text{-}SSB}$] sub-channels when S-SSB with index 0 is received. The receiving UE 104-2 may report the beam measurements using on next QuantizeOp[L/$\text{No}_{S\text{-}SSB}$] sub-channels, when the S-SSB with index 1 is received. The sub-channel may be a group of Resource Blocks (RBs) and the size of the sub-channel may be preconfigured by the wireless communication network 100. The receiving UEs 104-2 may share QuantizeOp[L/$No_{S-SSB}$] number of sub-channels over a slot among all the UEs receiving a beam with the same index.

The receiving UE 104-2 may generate a report for decoded S-SSBs by using the implicit reporting. The receiving UE 104-2 may be configured to report details of one or more best beams. If the receiving UE 104-2 is configured to report for one beam, then the receiving UE 104-2 may generate a sequence as a function of the receiving UE-ID and may transmit the sequence over allocated sub-channels for a corresponding best S-SSB beam. If the receiving UE 104-2 is configured to feedback more than one best beam, then the receiving UE 104-2 may generate the sequence as a function of receiving UE-id and may transmit the sequence over the sub-channel corresponding to all selected best S-SSB beams. The sequences may be orthogonal across different UEs indicating the same index i.e. sequences transmitted over same allocation per beam are chosen to be orthogonal. In such case, receiving UE-id may be mapped based on its Layer-2 ID.

The transmitting UE 104-1 may receive the feedback from the receiving UE 104-2 in the fixed resources. The transmitting UE 104-1 may detect the receiving UE-IDs may be mapped with predefined sequences and may be detected using a correlation operator. The receiving UE-ID may correspond to index given by $i_{S-SSB}$ using a correlation operation between received signal and the possible transmission sequence. The transmitting UE 104-1 may update the entries of the beam management table using the detected beams for corresponding UE-ids. The transmitting UE 104-1 or the BS 102 may provide a reporting resource configuration in terms of sub-channel.

In another implementation, the receiving UE 104-2 may report the best beam to the transmitting UE 104-1 by explicit reporting. The explicit reporting may be performed over RRC message, MAC-CE message, Downlink Control Indicator (DCI), and/or Subscriber Controlled Input (SCI). The receiving UE 104-2 may report the best beam(s) using a MAC-CE payload. The receiving UE 104-2 may generate the MAC-CE payload and may determine resources to report the MAC-CE payload either using sensing mechanism or provided by the BS 102 or the transmitting UE 104-1 or a special node. The receiving UE 104-2 may report the feedback over the resources by transmitting the MAC-CE packet to the transmitting UE 104-1. The report may comprise at least one of the beam-id, beam-strength, and beam validity. The beam id may be log 2 (N) bit long for one of N beams, where N is a number of at least one of the SL-CSI-RS beam and the SSB-beam. The beam id may be N bits long, wherein a bit position in the beam id corresponds to the beam to be reported. The bit position of the bit map may be set to one of 0 and 1 if the corresponding beam is to be reported, otherwise set to compliment of one of 0 and 1. The beam strength may be reported using M*b bits, wherein M is number of bits per beam strength and b is number of beam strength to be reported.

The transmitting UE 104-1 may transmit the reference signal in form of Side-link CSI-RS. The SL-CSI-RS may be used in NR sidelink for link adaptation for unicast links based on the reported Channel Quality Indicator (CQI) from the receiving UE 104-2 to the transmitting UE 104-1. The transmitting UE 104-1 may determine the CQI based on the channel measurement using the SL-CSI-RS transmitted in the PSSCH region. To improve the spectral efficiency, rank adaption for unicast may be supported by measuring the rank using SL-CSI-RS and is indicated using Rank Indicator (RI). CQI and RI may be combined to represent Channel State Information (CSI) that may be reported by the receiving UE 104-2 to the transmitting UE 104-1 for link and rank adaption. In NR sidelink, the CSI is reported using sidelink CSI reporting medium access control-control element (MAC-CE) container, as shown below in Table 2, RI indicates a value of the rank indicator for sidelink CSI reporting. The length of the field is 1 bit as up to two layers are supported for sidelink unicast link. CQI indicates channel quality for sidelink CSI reporting, the length of the field is 4 bits. R is for reserved bits, set to 0.

TABLE 2

| RI | CQI | R | R | R |
|---|---|---|---|---|

Figure 5:
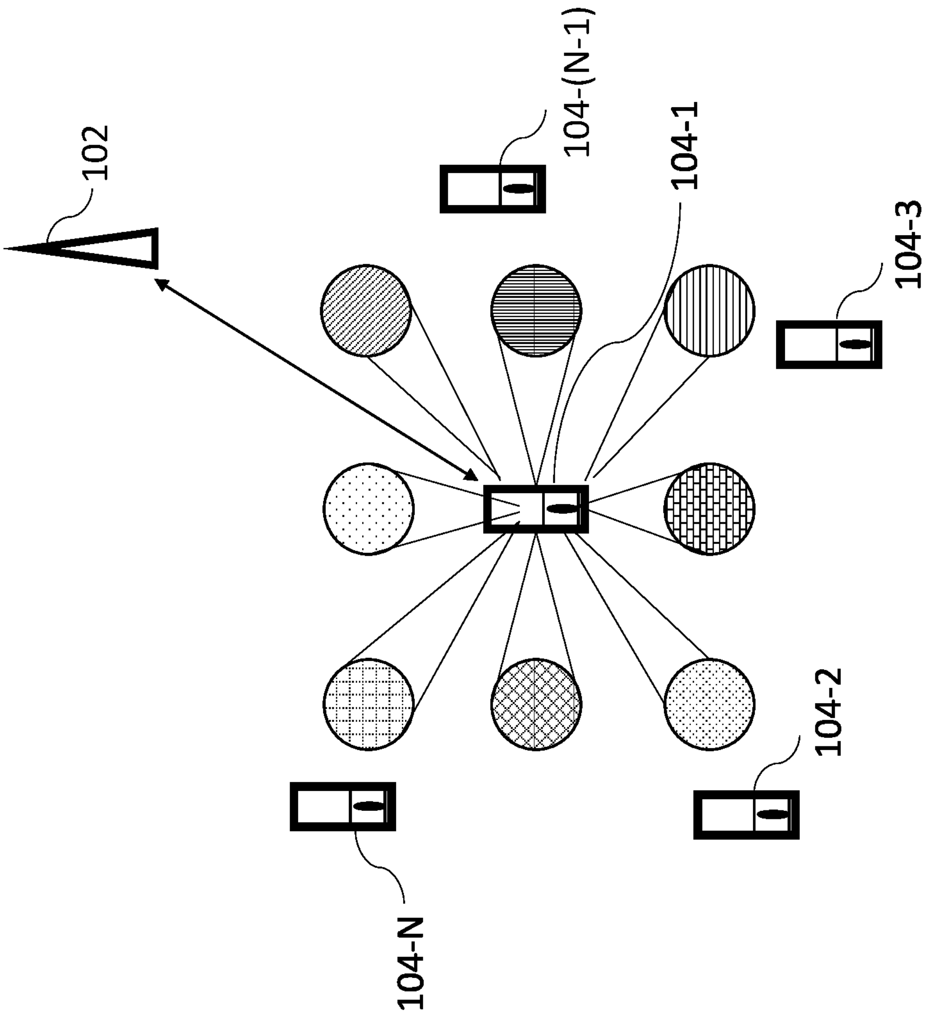
FIG. 5 illustrates transmission of Side-link Channel State Information-Reference Signal (SL-CSI-RS) by a UE, in accordance with an embodiment of the present invention.

The existing framework of the SL-CSI-RS may be enhanced for beam management. FIG. 5 illustrates transmission of the SL-CSI-RS by the transmitting UE 104-1, in accordance with an embodiment of the present invention. The transmitting UE 104 is capable of transmitting SL-CSI-RS beams in different directions. The transmitting UE 104 may transmit 'N' number of SL CSI-RS beams. Each beam may be either time-frequency or space multiplexed. SL-CSI-RS corresponding to each beam will be configured using sl-CSI-RS-Config information element in RRCReconfigurationSiclelink message. Before transmission of sidelink data unicast link is established, based on that Layer-2 ID assigned to UEs for a unicast link. The layer-2 ID may identify a particular UE in a unicast link.

The transmitting LYE 104-1 (referred as source UE), may be identified using Layer-2 source ID and the receiving UEs 104, referred as destination UEs, may be identified using Layer-2 destination ID. The Layer-2 source ID and destination ID may be 24 bits long and split at the MAC layer into two-bit strings. One-bit string LSB part (8 bits) of Layer-2 source ID may identify the source of the intended data in sidelink control information and one-bit string LSB part (16 bits) of Layer-2 destination ID may identify the target of the intended data in sidelink control information sent in 2nd stage SCI. Another bit string which is the MSB part of Layer-2 source ID, 16 bits and Layer-2 destination ID, 8 bits used for packet filtering at MAC layer. The transmitting UE 104-1 may trigger the SL-CSI-RS report for the receiving UE 104-2 identified using Destination layer-2 ID and by setting the value 1 of the field "CSI request" present in $2^{nd}$ stage sidelink control information, SCI 2-A. The sidelink Channel State Information (SL-CSI) reporting procedure may be used to provide a peer UE with sidelink channel state information, and may be used for link adaption and rank adaption. Triggering for the SL-CSI-RS report may be indicated using SCI-2A and the SL-CSI-RS report may utilize MAC-CE.

The framework of the SL-CSI-RS may be modified for beam management. In the case of beam management using SL-CSI-RS, a new MAC-CE may be introduced using fields as described with reference to below provided Table 3:

TABLE 3

| Beam-id | Beam-strength | Beam-validity | R | R |
|---|---|---|---|---|

The transmitting UE 104-1 may include the best beam(s) out of total beams in the Beam-id field of the beam management table. If the S-SSB is utilized as the beam reference signal, total number of beams are $No_{S-SSB}$ since one beam per S-SSB may be transmitted. If the SL-CSI-RS is utilized as the beam reference signal, total number of beams are N, since SL-CSI-RS beams may be transmitted. If the receiving UE 104-2 is configured to report one beam, then the Beam-id field may have $\log_2(No_{S\text{-}SSB})$ number of bits or log 2 (N) bit. If the receiving UE 104-2 may be configured to report more than one beam, then the Beam-id field may have $No_{S\text{-}SSB}$ number of bits or N bits. The receiving UE 104-2 may indicate selected beams by a value of one at the corresponding positions.

The beam management table of the transmitting UE 104-1 may indicate the strength measured in terms of S-SSB-RSRP, S-SSB-SINR, SL-CSI-RS-RSRP, or SL-CSI-RS-SINR for selected beam(s) in the Beam-strength field. If the receiving UE 104-2 reports k number of beams, then the Beam-strength field may contain b*k bits. The S-SSB-RSRP, S-SSB-SINR, SL-CSI-RS-RSRP or SL-CSI-RS-SINR measurements may require b bits each.

The beam management table of the transmitting UE 104-1 may indicate the time duration for which the beam may be valid in the Beam-validity field. The receiving UE 104-2 may report the Beam-validity using absolute value of time or using probability over a time interval.

In one aspect, the receiving UE 104-2 may report the absolute value of time, which may be measured in number of symbols, mini slots, slots, subframes, frames, sec, or m sec. The receiving UE 104-2 may compute the absolute value by quantizing maximum possible absolute value and pre-configured resolution. The absolute value may be computed using below provided equation 4.

$$\text{QuantizeOp}([T\_\text{absoulte})/(V\_\text{resolution}]) \quad (4)$$

In above equation, $T_{absolute}$, represents a maximum value of absolute time and $V_{resolution}$ represents a resolution to indicate validity will be pre-configured by a network. The resolution may be defined in terms of number of symbols, mini-slots, slots, sub frames, frames, sec, m sec, or micro sec.

The receiving UE 104-2 may report the beam measurements using the probability over the time interval, for example, probability of beam validity for successive symbol/minislots/slots/sub frames/frame after a symbol/slot/sub frame, or frame. The transmitting UE 104-2 or the BS 102 may fix a probability threshold and may provide the probability threshold to the receiving UE 104-2. The receiving UE 104-2 may report a time window showing beam valid probability above the probability threshold. The time window may be defined in form of number of symbols, mini-slots, slots, sub frames or frames, sec, m sec, or micro sec.

The transmitting UE 104-1 may receive the MAC-CE for beam management. The transmitting UE 104-1 may update the beam management table based on the information of the beam management for the receiving UE 104-2.

In one implementation, the transmitting UE 104-1 may compute the beam validity based on a regression-based model and/or a reinforcement-based model. The data set may be received from the receiving UEs 104-2, 104-4. The regression-based model and/or the reinforcement-based model may use Artificial Neural Network (ANN) to model the beam validity. The regression-based model may provide a finite value of beam-validity in the number of slots, symbols, sub frames, and/or frames. The reinforcement-based model may provide a probability for a given time duration measured in form of the number of slots, symbols, sub-frames, and/or frames.

The parameters that may affect time validity are Doppler, UE direction, UE speed, beam-strength, and beam angle measured at the receiving UE 104-2. The Doppler shift may represent a relative motion between the transmitting UE 104-1 and the receiving UE 104-2. The beam-strength may be measured as Reference Signal Received Power (RSRP) and the beam angle may provide information about received beam angles at the receiving UE 104-2 defined by an elevation and azimuth angles of a peak of a radiation pattern of an antenna array. The UE direction may provide information about the direction in which the receiving UE 104-2 is moving, for example, "East, West, North, and South". A speed of the receiving UE 104-2 may be measured in m/sec. The ANN may utilize these parameters to compute the validity of the beam.

Figure 6:
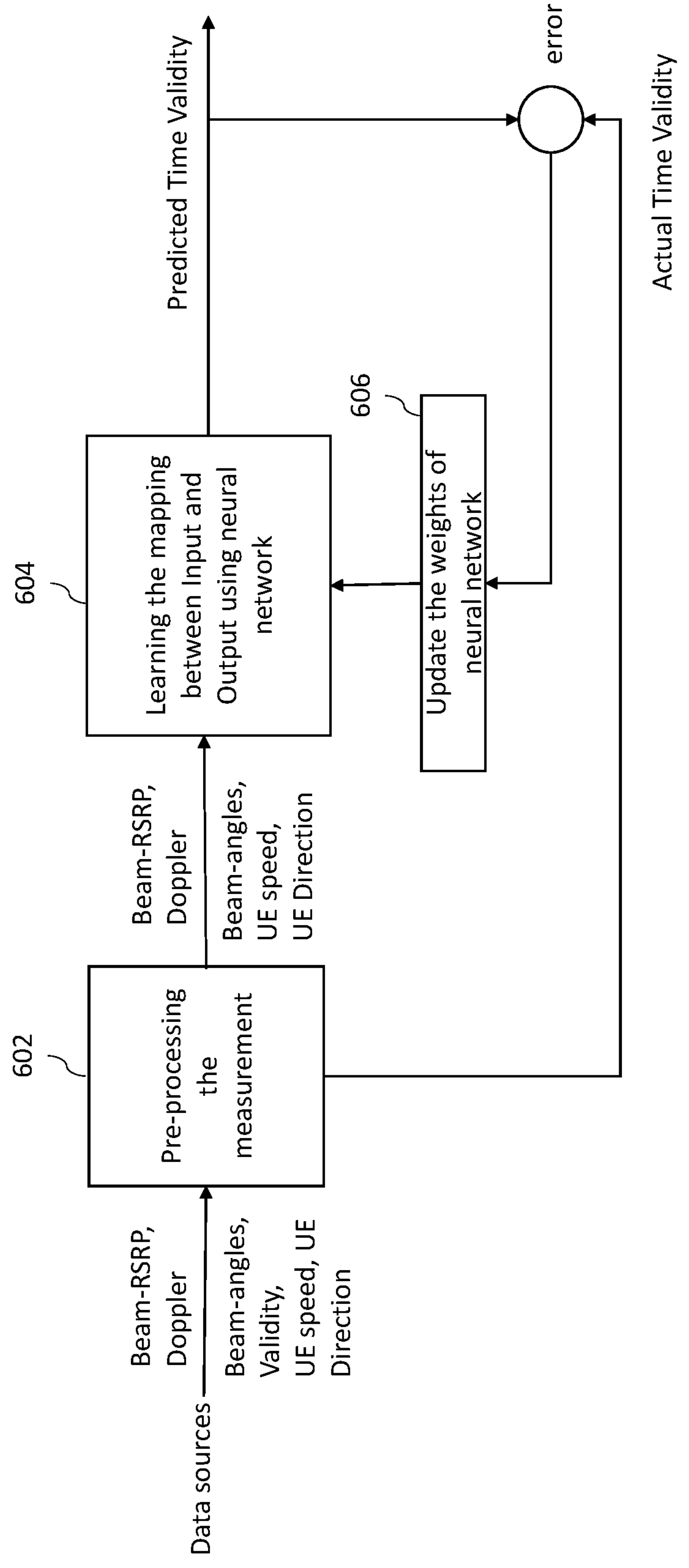
FIG. 6 illustrates a flow diagram of a method for computing beam-validity using a regression-based model, in accordance with an embodiment of the present invention.

FIG. 6 illustrates a flow diagram of a method for computing beam-validity using a regression-based model, in accordance with an embodiment of the present invention. The wireless communication network 100 may comprise a special node, such as a Roadside Unit (RSU). The special node may be a stationary infrastructure entity supporting V2X communication. The special node may exchange messages with other entities supporting the V2X communication. The ANN is trained at the special node by using the data set obtained from V2X UEs in the proximity. Data sources of the data set may be the UEs 104 present in the proximity of the special node. The UEs 104 may provide the measurements, such as beam-strength, Doppler shift, beam angles, UE direction, and UE speed to the special node.

The special node may pre-process the data set, at step 602. After pre-processing, the data set may be used to learn the mapping between input and output using neural network, at step 604. The special node may deter mine an error in predicted data determined using the data set, at step 606. Further, weights of nodes of the neural network may be updated using the error, at step 608.

Figure 7:
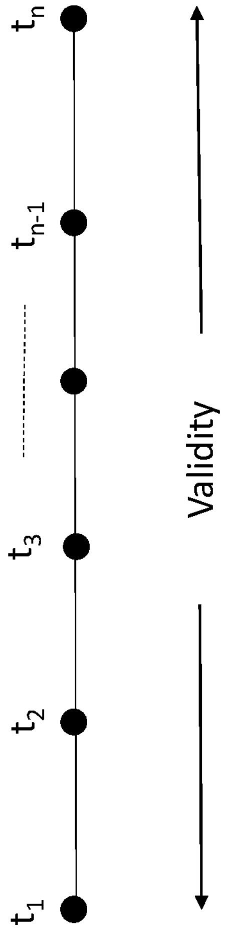
FIG. 7 illustrates number of measurements for each parameter over a validity period, in accordance with an embodiment of the present invention.

FIG. 7 illustrates number of measurements for each parameter over a validity period, in accordance with an embodiment of the present invention. The UE 104 may measure 'n' number of measurements of the above-mentioned parameters during the validity of beam. 'n' number of measurements for each parameter may be performed by the UE 104. A value of 'n' may be different for different UEs depending on the scenario i.e. all UEs 104 may not be able to determine an equal number of measurements during their beam validity period.

Referring back to FIG. 6, the UE 104 may share the measurements to the special node. After receiving the measurements, the special node may prepare training data set for the ANN by pre-processing the measurement data, at step 602. For preparing the training data, the special node may combine data from multiple data sources and may form a data set. The pre-processing may reduce the dimension of data, may suppress redundancy, and may extract meaningful information for efficient training of the ANN. Further, the pre-processing may avoid overfitting and under fitting of the training data. Once the training data set is prepared by the special node, the training data set may be used to train the neural networks, at step 604. For example, the special node may learn a mapping between input and output using the neural networks. The regression-based model of the neural networks may use an error backpropagation algorithm to update weights of the neural network, at step 606. Once training is completed, the special node may offload the regression-based model to UEs 104. The UEs 104 in a particular region may make use of the training data from the special node present in that region.

Figure 8:
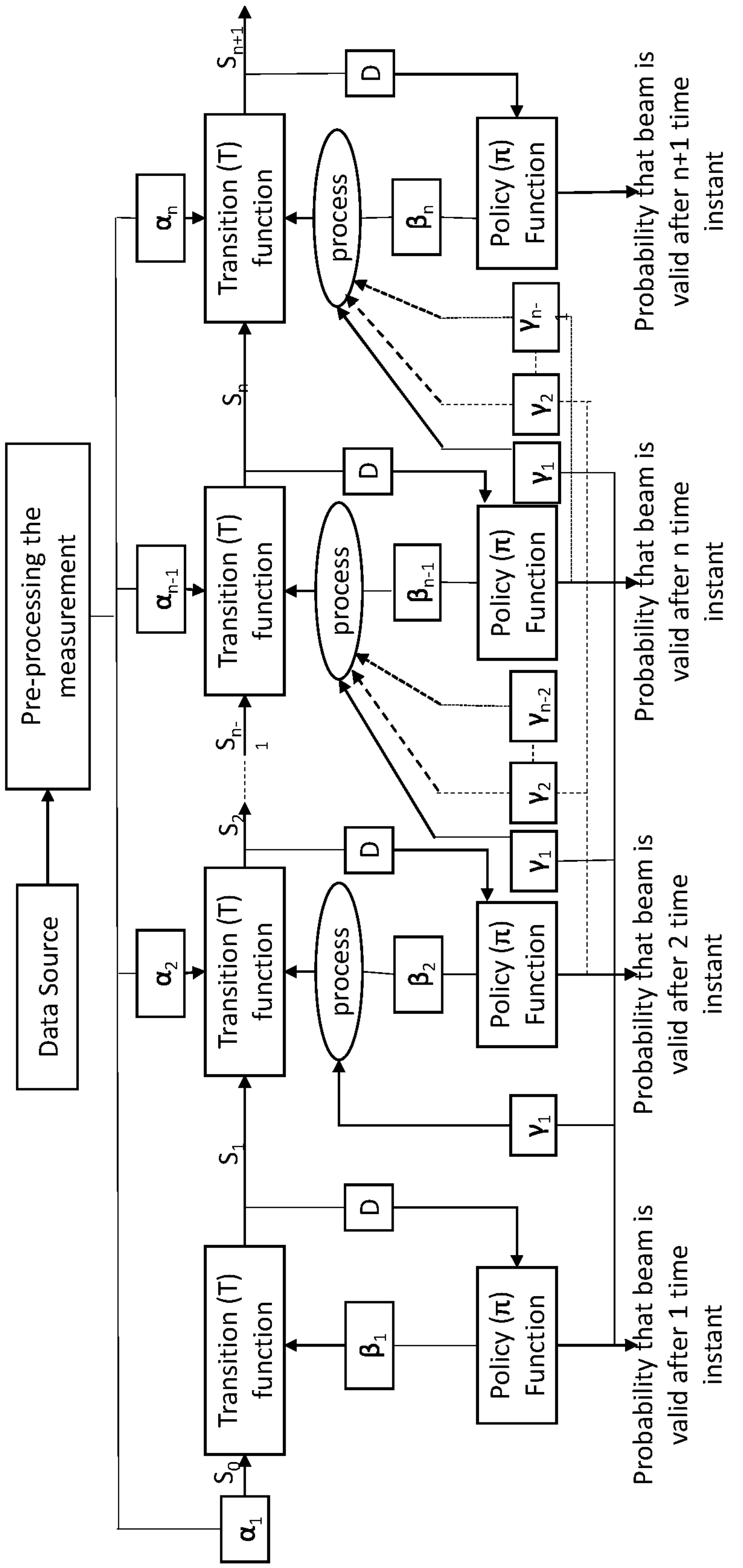
FIG. 8 illustrates a flow diagram of a method for computing beam-validity using a reinforcement-based model, in accordance with an embodiment of the present invention.

FIG. 8 illustrates a flow diagram of a method for computing beam-validity using a reinforcement-based model, in accordance with an embodiment of the present invention. The UE 104 may predict a value of probability for validation of a beam after a certain time instant. Time instant may be defined in terms of symbols, mini slots, slots, sub frames, frames, sec, milli sec, and micro sec. The functionality of data source and pre-processing of the measurement blocks is similar to the regression-based method. The transition function may learn the mapping from one state to another state, where the state defines a time instant which is 'M' symbol, slots, sub frames, frames, sec, m sec, micro sec after the initial state. The policy function may provide a predicted probability value that determines the validity of the beam in a particular state. The process block may control previous state and current state observations from policy function that are taken into consideration to update T-function. The co-efficient $\alpha_i$, $\beta_i$ and $\gamma_i$ are weight co-efficient that may provide controlled input to transition function. The block 'D' may be one-unit delay in terms of symbol, slots, sub frames, frames, sec, milli sec, and micro sec.

In the above detailed description, reference is made to the accompanying drawings that form a part thereof, and illustrate the best mode presently contemplated for carrying out the invention. However, such description should not be considered as any limitation of scope of the present invention. The structure thus conceived in the present description is susceptible of numerous modifications and variations, all the details may furthermore be replaced with elements having technical equivalence.

We claim:

1. A method of beam management in side-link communication between User Equipment (UEs) operating in a wireless communication network, the method comprising:

measuring, by an at least one second UE, at least one beam strength of a plurality of beams received from an at least one first UE over at least one reference signal, wherein the beam strengths are measured as a function of at least one of a Side-link Synchronization Signal Block (S-SSB)-Reference Signal Receiver Power (RSRP), Side-link Channel State Information Reference Signal (SL-CSI-RS)-Reference Signal Receiver Power (RSRP), SL-CSI-RS-Signal to Interference Plus Noise Ratio (SINR), and S-SSB-Signal to Interference Plus Noise Ratio (SINR);

comparing the at least one beam strength of the plurality of beams with a threshold value, wherein the threshold value is a function of at least one of a S-SSB-RSRP threshold value, a S-SSB-SINR threshold value, a SL-CSI-RS-RSRP threshold value, and a SL-CSI-RS-SINR threshold value;

selecting, by the at least one second UE, the at least one beam based on the comparison; and reporting, by the at least one second UE, at least one information of the at least one beam to the at least one first UE, wherein the at least one beam selected by the at least one second UE using a S-SSB beam is reported, in a time instant ($T_{slotgap}$) after a last S-SSB is transmitted over a S-SSB period, and wherein the last S-SSB is transmitted in a slot with a value determined by:

$$\text{timeoffsetSSBSL}+\text{timeIntervalSSBSL}*N_{S\text{-}SSB}-1$$

wherein timeoffsetSSB-SL indicates an offset in terms of slots from a start of the period to the slot in which a first S-SSB is transmitted, wherein timeIntervalSSB-SL indicates a slot interval between consecutive S-SSBs, and wherein $No_{S\text{-}SSB}$ represents a number of S-SSBs transmitted in different directions using different beams over the S-SSB-period and an S-SSB index ($i_{S\text{-}SSB}$) within the number of S-SSBs in the period.

2. The method as claimed in claim 1, further comprising:

transmitting, by the at least one first UE, at least one reference signal using at least one beam;

receiving, by the at least one first UE from the at least one second UE, a feedback report of the at least one beam based on the at least one reference signal, wherein the feedback report of the at least one beam comprises at least one of UE identifier (ID), beam ID, beam strength, and beam validity; and updating, by the at least one first UE, entries of a beam management table based on the feedback report.

3. The method as claimed in claim 2, further comprising scheduling, by the at least one first UE, the transmission of the at least one beam using the beam management table.

4. The method as claimed in claim 2, further comprising transmitting, by the at least one first UE, the reference signal when the at least one first UE determines that the entries of the beam management table is one of unknown and invalid.

5. The method as claimed in claim 2, wherein the reference signal is at least one of S-SSB and SL-CSI-RS.

6. The method as claimed in claim 5, wherein a plurality of SL-CSI-RS beams multiplexed in at least one of time, frequency, and space, are transmitted in different directions.

7. The method as claimed in claim 6, wherein the plurality of SL-CSI-RS beams are configured using at least one of the Radio Resource Control (RRC) message, Medium Access Control-Control Element (MAC-CE) message, Downlink Control Information (DCI), and Sidelink Control Information (SCI).

8. The method as claimed in claim 5, wherein the S-SSB is functions of time offset, time interval, number of S-SSBs transmitted in different directions using different beams over time, and S-SSB index within the number of S-SSBs in the S-SSB period.

9. The method as claimed in claim 1, wherein the at least one beam is one of the S-SSB beam and an SL-CSI-RS beam.

10. The method as claimed in claim 1, wherein the reporting of at least one information of the at least one beam comprises at least one of a beam ID, beam-strength, and beam validity.

11. The method as claimed in claim 10, wherein the reporting of the at least one information comprises transmission of at least one of an absolute value and relative value of the at least one information of the at least one beam in predetermined resources.

12. The method as claimed in claim 11, wherein the at least one information is transmitted as a quantized value.

13. The method as claimed in claim 10, wherein the beam ID is log 2 (N) bit long for one of N beams, wherein N is a number of at least one of the SL-CSI-RS beam and the S-SSB-beam.

14. The method as claimed in claim 10, wherein the beam ID is N bits long, wherein a bit position in the beam ID corresponds to the beam to be reported.

15. The method as claimed in claim 14, wherein the bit position of a bit map is set to one of 0 and 1 if the corresponding beam is to be reported, otherwise set to compliment of one of 0 and 1.

16. The method as claimed in claim 10, wherein the beam strength is reported using M*b bits, wherein M is number of bits per beam strength and b is number of beam strength to be reported.

17. The method as claimed in claim 1, wherein the at least one information of the at least one beam is reported by the at least one second UE using at least one time-frequency resource, and the at least one time-frequency resources is provided by one of the at least one first UE and a Base Station (BS).

18. The method as claimed in claim 1, wherein number of beams to be selected is configured by the at least one first UE.

19. The method as claimed in claim 1, wherein the reporting of the at least one information is performed using fixed time-frequency resources allocated to the at least one beam.

20. The method as claimed in claim 1, wherein the S-SSB index (is-SSB) is determined using:

$$i_{S\text{-}SSB}=(\text{slotindex}-\text{timeoffsetSSBSL})/\text{timeIntervalSSBSL}$$

wherein slot index indicates the slot in which S-SSB is transmitted in the S-SSB period.

21. The method as claimed in claim 1, wherein the at least one information of the at least one beam is reported implicitly by transmitting a sequence as a function of a UE-ID over sub-channels corresponding to the at least one beam using the fixed time-frequency resources allocated to the at least one second UE.

22. The method as claimed in claim 21, wherein the UE-ID is mapped with predefined sequences and is detected by the at least one first UE using a correlation operation between the sequence received from the at least one second UE and a pre-defined sequence.

23. The method as claimed in claim 22, wherein the mapping is provided by at least one of RRC message, MAC-CE message, DCI, and SCI.

24. The method as claimed in claim 1, wherein the reporting is performed over at least one of RRC message, MAC-CE, DCI, and SCI.

25. The method as claimed in claim 2, wherein the beam validity is reported using at least one absolute value measured in at least one of number of symbols, mini slots, slots, subframes, frames, and beam validity probability over a time interval.

26. The method as claimed in claim 25, wherein the at least one absolute value is quantized using maximum possible absolute value and pre-configured resolution as:

$$\text{QuantizeOp}[T_{absoulte}/V_{resolution}]$$

wherein $T_{absolute}$ indicates a maximum value of absolute time and $V_{resolution}$ indicates a resolution to indicate validity pre-configured by the wireless communication network (100).

27. The method as claimed in claim 25, wherein a time duration of the at least one beam validity is reported for which the beam valid probability is above a predefined threshold.

28. The method as claimed in claim 2, wherein the beam validity is computed by implementing at least one of a regression-based model and a reinforcement-based model, on a data set, and wherein the data set is received from one or more of at least one of the first UE and at least one of the second UE.

29. The method as claimed in claim 28, wherein the data set comprises at least one of a Doppler shift, UE direction, UE speed, beam-strength, and beam angle measured by at least one of the second UE.

30. The method as claimed in claim 29, wherein the Doppler shift indicates a relative motion between the at least one first UE and the at least one second UE.

31. The method as claimed in claim 29, wherein the beam angle is measured as an elevation angle and azimuth angle of a peak of a radiation pattern of an antenna array.

32. The method as claimed in claim 28, wherein the regression-based model is trained using training data sets received from the at least one second UE.

33. The method as claimed in claim 28, wherein the at least one beam validity is computed using the reinforcement-based model by predicting at least one value of probability indicating that corresponding beam is valid for a time period.

34. The method as claimed in claim 33, wherein the time period is defined in terms of at least one of symbols, mini slots, slots, sub frames, frames, seconds, m sec, and micro sec.

* * * * *